(12) United States Patent
Deimichei et al.

(10) Patent No.: US 12,729,735 B2
(45) Date of Patent: Sep. 8, 2026

(54) POSITIONING ASSEMBLY AND BRAKE PISTON ASSEMBLY

(71) Applicant: DANA ITALIA S.R.L., Arco (IT)

(72) Inventors: Davide Deimichei, Arco (IT); Carlo Aste, Arco (IT); Michele Boccato, Arco (IT)

(73) Assignee: DANA ITALIA S.R.L., Arco (IT)

( * ) Notice: Subject to any disclaimer, the term of this patent is extended or adjusted under 35 U.S.C. 154(b) by 482 days.

(21) Appl. No.: 18/331,834

(22) Filed: Jun. 8, 2023

(65) Prior Publication Data

US 2023/0400077 A1 Dec. 14, 2023

(30) Foreign Application Priority Data

Jun. 9, 2022 (DE) .................... 20 2022 103 255.6

(51) Int. Cl.

*F16D 65/54* (2006.01)
*F16D 65/18* (2006.01)
*F16D 121/04* (2012.01)
*F16D 125/06* (2012.01)
*F16D 127/02* (2012.01)

(52) U.S. Cl.

CPC ............. *F16D 65/54* (2013.01); *F16D 65/18* (2013.01); *F16D 2121/04* (2013.01); *F16D 2125/06* (2013.01); *F16D 2127/02* (2013.01)

(58) Field of Classification Search

CPC ...................................................... F16D 65/54
See application file for complete search history.

(56) References Cited

U.S. PATENT DOCUMENTS 2,900,052 A * 8/1959 Frayer ..................... F16D 65/18 188/196 P
3,064,768 A * 11/1962 Dotto ..................... F16D 65/18 188/196 P
3,085,663 A * 4/1963 Jakeways ............... F16D 65/18 192/111.1
3,542,165 A * 11/1970 Rene ....................... F16D 65/54 188/196 P
3,949,843 A * 4/1976 Holcomb, Jr. ........ F16D 65/543 188/196 R
6,131,705 A * 10/2000 Dahlen .................. F16D 65/54 188/196 R
6,367,591 B1 * 4/2002 Gosda .................... F16D 65/54 188/196 R (Continued)

FOREIGN PATENT DOCUMENTS

DE 2436541 A1 * 2/1976 ............. F16D 65/54

OTHER PUBLICATIONS

Machine translation of DE 2436541 (no date).*

*Primary Examiner* — Nicholas J Lane
(74) *Attorney, Agent, or Firm* — McCoy Russell LLP

(57) ABSTRACT

The present disclosure further relates to a positioning assembly, such as for positioning a brake piston. The positioning assembly comprises a support member extending along an axis, a first compression-loaded member, and a second compression-loaded member, wherein the first compression-loaded member and the second compression-loaded member are axially supported on or configured to be axially supported on the support member. The present disclosure further relates to a brake piston assembly including said positioning assembly.

16 Claims, 3 Drawing Sheets

(56) References Cited

U.S. PATENT DOCUMENTS

| | | | | |
|---|---|---|---|---|
| 11,078,975 | B2 | 8/2021 | Fricke et al. | |
| 11,703,098 | B2 * | 7/2023 | Babicki | F16D 55/40 188/196 R |
| 2007/0227836 | A1 * | 10/2007 | Kingston | F16D 13/757 188/73.1 |

* cited by examiner 1
2
3
4
10
1a
1b
1b'
1b''
1c
1c'
1c''
1d
4a
4b
4c
4c''
4d
4'
3'
3''

POSITIONING ASSEMBLY AND BRAKE PISTON ASSEMBLY

CROSS REFERENCE TO RELATED APPLICATION

The present application claims priority to German Utility Model Application No. 20 2022 103 255.6, entitled "POSITIONING ASSEMBLY AND BRAKE PISTON ASSEMBLY", and filed on Jun. 9, 2022. The entire contents of the above-listed application is hereby incorporated by reference for all purposes.

TECHNICAL FIELD

The present disclosure relates to a positioning assembly and to a brake system including said positioning assembly.

BACKGROUND AND SUMMARY

Brake systems for automotive vehicles typically include one or more brake plates which may be frictionally engaged with one or more brake discs connected to an axle or wheel to be braked. Often, a piston, e. g. a hydraulic piston, is used to press the brake plates against the brake disc during a braking maneuver. After braking a return spring normally returns the piston to a retracted or non-braking position.

Since the brake plates and the brake discs may experience wear over time, the piston stroke, i. e. the distance the piston travels between the braking position and the non-braking position, may increase over time. This may impair vehicle safety and operability. In order to ensure a constant piston stroke irrespective of a level of wear, many brake systems further include an adjustment spring which adjusts the width of an air gap between the piston and the brake plates in the non-braking position.

For example, U.S. Ser. No. 11/078,975B2 relates to a resetting device by which a brake caliper can be reset after a braking-induced displacement and release of a brake. The resetting device has a spreading device which has resilient spreading elements. The spreading device is arranged in a central opening of the brake caliper. The spreading elements engage, outside the friction pads, directly or indirectly on one side at at least two abutment regions arranged spaced apart from one another relative to the center, of the brake pads, where the abutment regions have one abutment surface and one bearing surface on which the spreading elements are movably arranged. The spreading device has spring arms, of which in each case two lie against an associated pad carrier plate, where the spring arms are connected to one another in the central region of the opening. The spring arms are connected to a retaining bow which is attached to a brake carrier.

However, there continues to be demand for brake systems which provide the functionality of a return spring and of an adjustment spring in a simple and compact manner.

This problem is solved by a positioning assembly including features as described herein and by a brake piston assembly including said positioning assembly.

The presently proposed positioning assembly, which may be used for positioning a brake piston, comprises:

a support member extending along an axis, a first compressible or compression-loaded member, and a second compressible or compression-loaded member, wherein the first compressible or compression-loaded member and the second compressible or compression-loaded member are axially supported on or configured to be axially supported on the support member.

The support member, the first compression-loaded member and the second compression-loaded member may be arranged concentrically with respect to the axis. The first compression-loaded member may be compression-loaded or compressible along the axis. For example, the first compression-loaded member may comprise a compression spring. The second compression-loaded member may be compression-loaded or compressible perpendicular to the axis. Specifically, the second compression-loaded member may comprise a section in which a diameter of the second compression-loaded member perpendicular to the increases along the axis. For example, the second compression-loaded member may comprise a conical or an essentially conical portion. The second compression-loaded member may be configured to slide on the support member along the axis.

The support member may comprise a support portion, for example a first support portion, for axially supporting the first compression-loaded member. And the support member may comprise support portion, for example a second support portion, for axially supporting the second compression-loaded member. A maximum diameter of the first support portion perpendicular to the axis may differ from a maximum diameter of the second support portion perpendicular to the axis. For instance, the maximum diameter of the first support portion may be larger than the maximum diameter of the second support portion. The first support portion for axially supporting the first compression-loaded member and the second support portion for axially supporting the second compression-loaded member may be axially distanced from one another.

The support member, the first compression-loaded member and the second compression-loaded member may be configured such that when the first compression-loaded member is supported on the first support portion and the second compression-loaded member is supported on the second support portion, the second compression-loaded member extends beyond the first compression-loaded member along the axis.

The presently proposed brake piston assembly comprises:

a stationary portion, a brake piston, and the above-described positioning assembly, wherein the support member is rigidly connected to the stationary portion, and wherein the brake piston is movable relative to the stationary portion along a piston axis arranged in parallel to the axis of the support member.

The first compression-loaded member may be axially supported on or may rest on the brake piston and on the support member. The first compression-loaded member may bias the brake piston toward the stationary portion along the piston axis.

The second compression-loaded member may be configured to slide on the support member between a first position in which the second compression-loaded member is axially supported on or rests on the stationary portion, and a second position in which the second compression-loaded member is axially supported on or rests on the support member.

The second compression-loaded member may be in frictional engagement with a portion of the brake piston. For example, a surface of the second compression-loaded member facing away from the support member may be in frictional engagement with a portion of the brake piston. The second compression-loaded member and the brake piston may be configured such that when the second compression-loaded member and the brake piston are frictionally engaged, axial movement of the brake piston relative to the second compression-loaded member toward the stationary portion increases frictional engagement between the second compression-loaded member and the brake piston, and axial movement of the brake piston relative to the second compression-loaded member away from the stationary portion decreases frictional engagement between the second compression-loaded member and the brake piston. A diameter of the second compression-loaded member perpendicular to the piston axis may increase along the piston axis and toward the stationary portion.

The brake piston and the positioning assembly may be configured such that when the brake piston and the second compression-loaded member are frictionally engaged, axial movement of the brake piston away from the stationary portion moves the second compression-loaded member away from the stationary portion until the support member stops further axial movement of the second compression-loaded member away from the stationary portion.

The stationary portion, the brake piston and the positioning assembly may further be configured such that when the brake piston and the second compression-loaded member are frictionally engaged, the first compression-loaded member is configured to axially move the brake piston and the second compression-loaded member toward the stationary portion until the stationary portion stops further axial movement of the second compression-loaded member and of the brake piston toward the stationary portion. Or in other words, the first compression-loaded member, the second compression-loaded member and the brake piston may be configured such that when the second compression-loaded member is in frictional engagement with the brake piston and the second compression-loaded member is axially supported on the stationary portion, a force exerted by the first compression-loaded member and biasing the brake piston toward the stationary portion is too small to axially move the brake piston relative to the second compression-loaded member toward the stationary portion against the friction between the second compression-loaded member and the brake piston.

Embodiments of the presently proposed positioning assembly and brake piston assembly are described in the following detailed description and are depicted in the accompanying drawing.

DETAILED DESCRIPTION

Figure 1A:
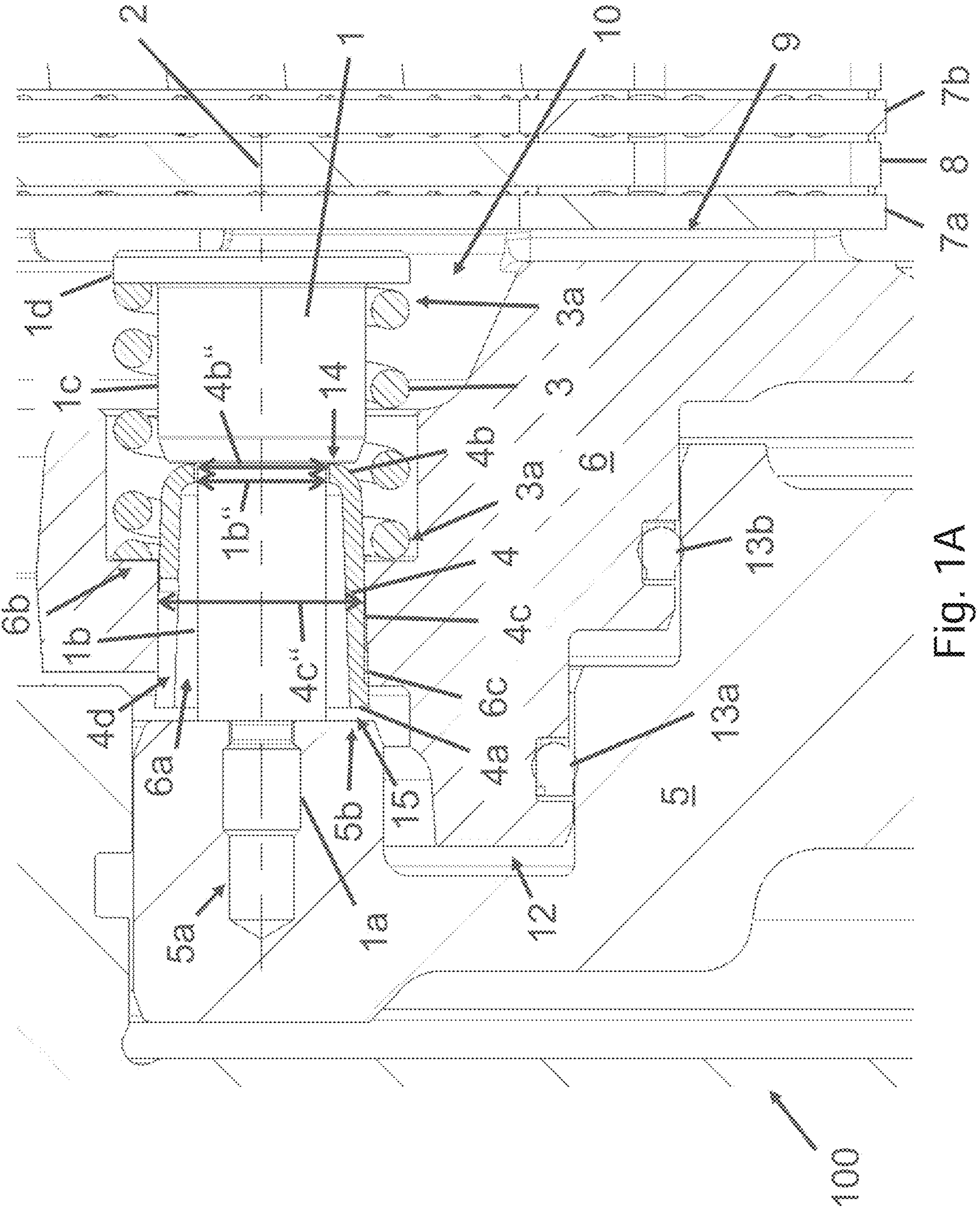
FIG. 1A schematically shows a sectional view of a brake piston assembly with a brake piston is in a braking position.
Figure 1B:
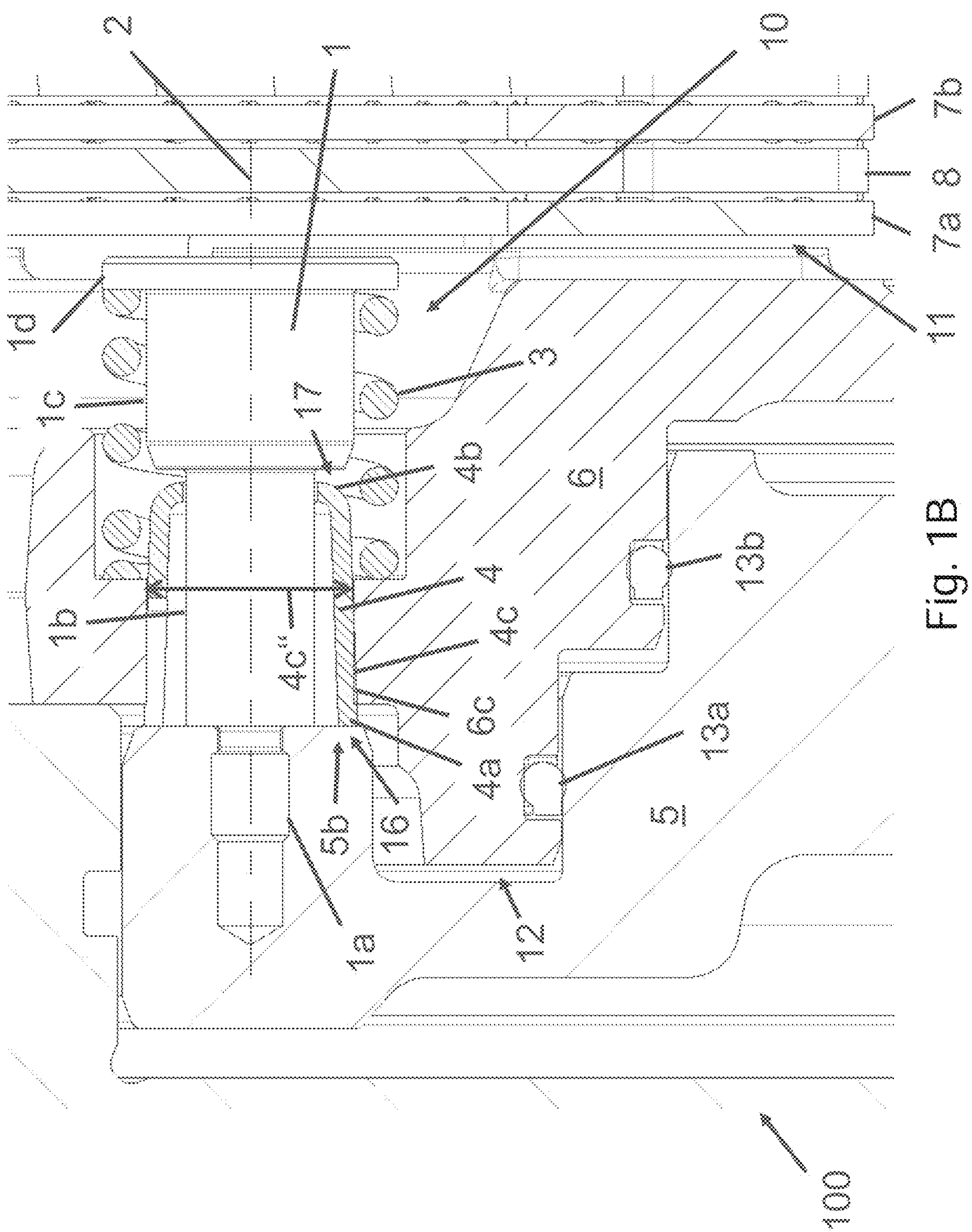
FIG. 1B schematically shows a sectional view of the brake piston assembly of FIG. 1A with the brake piston is in a retracted position.
Figures 2A, 2B:
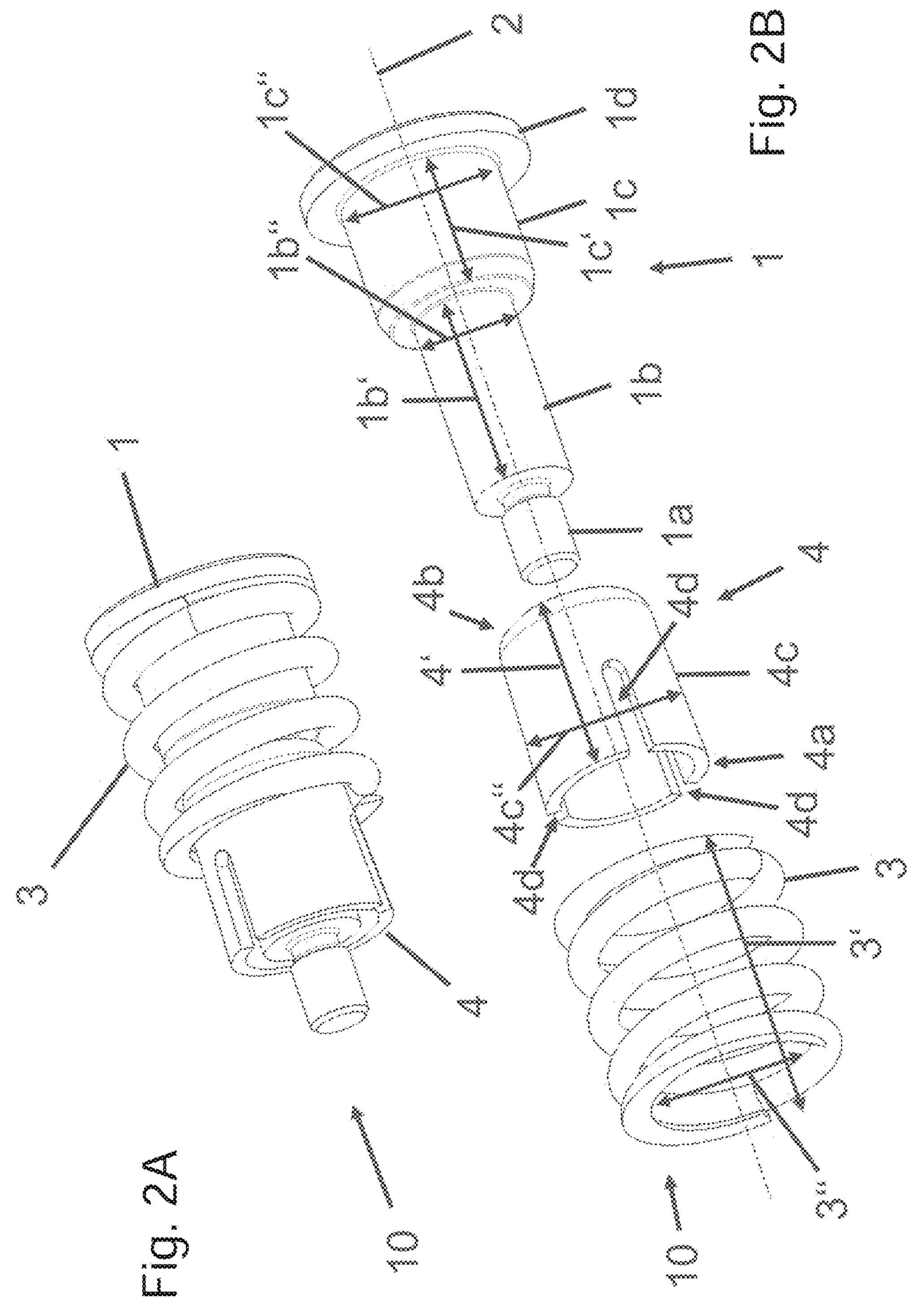
FIG. 2A schematically shows a perspective view of a positioning assembly of the brake piston assembly of FIGS. 1A and 1B.
FIG. 2B schematically shows an exploded perspective view of the positioning assembly of FIG. 2A.

FIGS. 1A and 1B schematically show a sectional view of a brake piston assembly 100 of the presently proposed type. For example, the brake piston assembly 100 may be used in an automotive vehicle, such as for braking a vehicle wheel or a vehicle axle of the automotive vehicle. The brake piston assembly 100 comprises a stationary portion 5, a brake piston 6 and a positioning assembly 10. A perspective view and an exploded perspective view of the positioning assembly 10 is depicted in FIGS. 2A and 2B, respectively. Here and in all of the following, features recurring in different figures are designated with the same reference signs. The stationary portion 5 may be stationary with respect to a vehicle frame, for example. The brake piston 6 is movable relative to the stationary portion 5 along an axis or axial direction 2. More specifically, the brake piston 6 is axially movable between a braking position, shown in FIG. 1A, and a retracted or non-braking position, shown in FIG. 1B. The positioning assembly 10 is configured to control an axial position of the brake piston 6, typically in the retracted or non-braking position. More specifically, the positioning assembly 10 is there to compensate for wear and to ensure a constant stroke of the brake piston 6, as will be explained in more detail below.

In the embodiment depicted here, the brake piston assembly 100 further includes brake plates 7*a*, 7*b* and a brake disc 8. In the embodiment shown in the figures, the brake piston 6 may be moved or pushed toward or into the braking position by filling a space 12 formed in between the stationary portion 5 and the brake piston 6 with a liquid such as oil. And the brake piston 6 may be allowed to retract to the non-braking position shown in FIG. 1B by discharging liquid from the space 12 to deplete or to at least partially deplete the space 12. The space 12 may be sealed by sealing members 13*a*, 13*b* such as sealing rings. The sealing members 13*a*, 13*b* are disposed in between the brake piston 6 and the stationary portion 5. The sealing members 13*a*, 13*b* may be mounted on the brake piston 6. For example, the sealing members 13*a*, 13*b* may be partially received in indentations formed in the brake piston 6. It is understood that in alternative embodiments not explicitly depicted here the brake piston 6 may be configured to be actuated by other than hydraulic means, such as by electromagnetic forces.

The brake plates 7*a*, 7*b* and the brake disc 8 extend perpendicular to the axis 2. Along the axis 2, the brake disc 8 is disposed in between the brake plates 7*a*, 7*b*. The brake disc 8 may be connected to an axle shaft in a torque proof manner such that braking or slowing down the brake disc 8 results in the braking or slowing down of the axle shaft. For instance, the brake disc 8 may be connected to the axle shaft via a splined connection which may allow the brake disc 8 to slide on an axial section of the axle shaft in a direction parallel to the axis 2, and which may rotationally fix the brake disc 8 to the axle shaft. Similarly, the brake plates 7*a*, 7*b* may be movable relative to the stationary portion 5 along the axis 2. At the same time, the brake plates 7*a*, 7*b* may be rotationally fixed relative to the stationary portion 5 with respect to an axis of rotation of the brake disc 8. In this way, the brake disc 8 may be braked by compressing the brake plates 7*a*, 7*b* along the axis 2, thereby causing them to frictionally engage with the brake disc 8.

In the braking position of FIG. 1A, the brake piston 6 is pressed against the brake plates 7*a*, 7*b* and the brake disc 8 along the axis 2 and in a direction away from the stationary portion 5. In the braking position, the brake piston 6 forces the brake plates 7*a*, 7*b* into frictional engagement with the brake disc 8 to brake or slow down the brake disc 8 and the vehicle wheel and/or the vehicle axle to which the brake disc 8 is connected. For example, in the braking position, the brake piston 6 or a lining disposed thereon is in contact with the brake plate 7*a*, as indicated at 9 in FIG. 1A.

In the retracted or non-braking position of FIG. 1B, the brake piston 6 is retracted from the brake plates 7*a*, 7*b* and the brake disc 8 along the axis 2 and toward the stationary portion 5 with respect to the braking position. In the retracted position, an air gap 11 is formed in between the brake piston 6 and the brake plate 7*a* along the axis 2. In the retracted position, the brake piston 6 allows the brake plates 7*a*, 7*b* to frictionally disengage from the brake disc 8 so that the brake disc 8 and the vehicle wheel and/or the vehicle axle to which the brake disc 8 is connected may rotate freely. For instance, disengagement members such as compression springs may be disposed in between the brake plates 7*a*, 7*b* and the brake disc 8 so that the brake plates 7*a*, 7*b* and the brake disc 8 are forced apart from one another as or once the brake piston 6 retracts from the braking position and moves toward the stationary portion 5.

The positioning assembly 10 comprises a pin-like or shaft-like support member 1. The support member 1 extends along the axis 2. The support member 1 may comprise or may be made of metal such as steel. However, it is understood that the support member may comprise or may be made of other materials. In the embodiment depicted in the figures, the support member 1 includes a first axial portion 1*a*, a second axial portion 1*b*, a third axial portion 1*c* and a fourth axial portion 1*d*. Here, the axial portions 1*a-d* of the support member 1 are made in one piece. Here, the support member 1 is symmetric, for example cylindrically symmetric with respect to the axis 2. It is understood that in other embodiments the support member 1 may not necessarily be symmetric or cylindrically symmetric. Further, in the embodiments depicted here, the axial portions 1*a-d* of the support member 1 each have a cylindrical or essentially cylindrical shape. The support member 1 is connected, for example rigidly connected, to the stationary portion 5. For example, the support member 1 and the stationary portion 5 may be connected via a threaded connection. It is understood that the support member 1 may be connected to the stationary portion 5 by means other than a threaded connection. In the embodiment shown in the figures, the first axial portion 1*a* of the support member 1 is received in a recess or boring 5*a* formed in the stationary portion 5.

A diameter 1*b*" of the second axial portion 1*b* perpendicular to the axis 2 (FIG. 2*b*) is larger than a diameter of the first axial portion 1*a* perpendicular to the axis 2. At a transition between the first axial portion 1*a* and the second axial portion 1*b* the support member 1 forms a first shoulder portion. At the first shoulder portion, the second axial portion 1*b* axially rests on the stationary portion 5. A diameter 1*c*" of the third axial portion 1*c* perpendicular to the axis 2 (FIG. 2*b*) is larger than the diameter 1*b*" of the second axial portion 1*b* perpendicular to the axis 2. At a transition between the second axial portion 1*b* and the third axial portion 1*c* the support member 1 forms a second shoulder portion 1. A diameter of the fourth axial portion 1*d* perpendicular to the axis 2 is larger than the diameter 1*c*" of the third axial portion 1*c* perpendicular to the axis 2. At a transition between the third axial portion 1*c* and the fourth axial portion 1*d* the support member 1 forms a third shoulder portion. It is understood that in alternative embodiments the support member 1 may have other shapes than the shape explicitly depicted in the figures.

The brake piston 6 includes a through hole or cutout 6*a* extending through the brake piston 6 or through a portion of the brake piston 6 along the axis 2. The support member 1 extends through the through hole or cutout 6*a* formed in the brake piston 6. For example, the support member 1 and the brake piston 6 are formed such that the support member 1 does not interfere with the brake piston 6 as the brake piston 6 moves between the braking position and the retracted or non-braking position.

The positioning assembly 10 further comprises a first compressible or compression-loaded member 3. For simplicity, in the following the first compressible or compression-loaded member 3 will be referred to as the member 3. The member 3 is configured to be loaded by compressing or at least partially compressing it along the axis 2. In the embodiment depicted in the figures, the member 3 includes a compression spring. The member 3 is disposed on or received on the support member 1 or on a portion of the support member 1. More specifically, the member 3 is received on the third axial portion 1*c* of the support member 1. An inner diameter 3" of the member 3 perpendicular to the axis 2 is larger or slightly larger than the diameter 1*c*" of the third axial portion 1*c* of the support member 1 perpendicular to the axis 2, for example by at most 10 percent of the diameter 1*c*". In this manner, the support member 1 or the third axial portion 1*c* of the support member 1 may center the member 3 on the support member 1, for example with respect to the axis 2. Here, the member 3 is disposed coaxially with the support member 1. When the member 3 is received on the support member 1, a portion of the support member 1, here the axial portion 1*d* of the support member 1, acts a mechanical stop for the member 3 and limits axial movement of the member 3 relative to the support member 1. Or in other words, when the member 3 is received on the support member 1, the member 3 is configured to be axially supported on or to axially rest on a portion of the support member 1. In this manner, the member 3 may be loaded by axially compressing or by at least partially axially compressing the member 3 against a portion of the support member 1.

The positioning assembly 10 further comprises a second compressible or compression-loaded member 4. For simplicity, in the following the second compressible or compression-loaded member 4 will be referred to as the member 4. The function of the member 4 is to compensate for wear of the brake piston 6 and/or of the brake plates 7*a*, 7*b* and the brake disc 8 in order to ensure a constant stroke of the brake piston 6 irrespective of mechanical wear. See FIGS. 2A and 2B for a perspective view of the member 4. The member 4 may comprise or may be made of a metal such as steel. However, it is understood that the member 4 may comprise or may be made of other rigid materials. The member 4 is received or disposed on the support member 1. More specifically, in the embodiment depicted here, the member 4 is received or disposed on the second axial portion 1*b* of the support member 1. The member 4 may axially move or slide on the support member 1. The member 4 extends along the axis 2 from a first axial end 4*a* to a second axial end 4*b*. Here, the member 4 has a sleeve-like shape. For example, the member 4 may include a conical portion 4*c* in which a diameter 4*c*" of the member 4 perpendicular to the axis 2 increases along the axis 2. More specifically, the diameter 4*c*" increases in an axial direction pointing from the second axial end 4*b* of the member 4 to the first axial end 4*a* of the member 4 or toward the stationary portion 5. The member 4 may be compression-loaded in a direction perpendicular to the axis 2. In the embodiment of the member 4 depicted in the figures, the member 4 includes axially extending recesses, cutouts or notches 4*d*. The recesses, cutouts or notches 4*d* extend from the first axial end 4*a* of the member 4 and along or at least partially along the conical portion 4*c* of the member 4. The axial length and a width of the recesses, cutouts or notches 4*d* may influence the stiffness of the member 4 perpendicular to the axis 2.

At the second axial end 4*b* of the member 4, an inner diameter 4*b*" of the member 4 perpendicular to the axis 2 is larger or slightly larger than the diameter 1*b*" of the second axial portion 1*b* of the support member 1 perpendicular to the axis 2, for example by at most five percent of the diameter 1*b*". In this manner, the support member 1 or the second axial portion 1*b* of the support member 1 may center the member 4 on the support member 1, for example with respect to the axis 2. Here, the member 4 is disposed coaxially with the support member 1.

When the member 4 is received on the support member 1, a portion of the support member 1, here the third axial portion 1*c* of the support member 1, acts a mechanical stop for the member 4 and limits axial movement of the member 4 relative to the support member 1. Or in other words, the member 4 is configured to be axially supported on or to axially rest on a portion of the support member 1. In the embodiment depicted in the figures, an axial length 4' of the member 4 is smaller than an axial length 1*b*' of the second axial portion 1*b* of the support member 1. As will be apparent from the following description, a difference between the axial length 1*b*' of the axial portion 1*b* and the axial length 4' of the member 4 determines the stroke of the brake piston 6.

In the embodiment of the positioning assembly 10 depicted in the figures, at least at an axial end section of the member 4 including the second axial end 4*b* the diameter 4*c*" of the member 4 perpendicular to the axis 2 is smaller than the inner diameter 3" of the member 3 perpendicular to the axis 2. Further, an axial length 1*c*' of the axial portion 1*c* of the support member 1 may be shorter than an axial length 3' of the member 3, for example when the member 3 is at least partially compressed. This allows the member 4 to be at least partially received within the member 3. This may render the positioning assembly 10 compact.

In the embodiment of the brake piston assembly 100 depicted in FIGS. 1A and 1B, the member 3 is axially clamped or compressed between a portion 6*b* of the brake piston 6 and a portion of the support member 1, here the axial portion 1*d*. The first axial end 3*a* of the member 3 is axially supported on the portion 6*b* of the brake piston 6, and the second axial end 3*b* of the member 3 is axially supported on the axial portion 1*d* of the support member 1. The member 3 is at least partially compressed and thus loaded both in the braking position of the brake piston 6 shown in FIGS. 1A and 1*n* the retracted or non-braking position of the brake piston 6 shown in FIG. 1B. As a result, the member 3 constantly exerts a retracting force on the brake piston 6, thereby biasing the brake piston 6 toward the stationary portion 5.

Along the axis 2, the member 4 is disposed in between a portion 5*b* of the stationary portion 5 and a portion of the support member 1, here the third axial portion 1*c* of the support member 1. The member 4 may move or slide on or with respect to the support member 1 along the axis 2. Axial movement of the member 4 is limited by a portion of the stationary portion 5 and by a portion of the support member 1, for example by the portion 5*b* of the stationary portion 5 and by the third axial portion 1*c* of the support member 1.

The member 4 is in frictional engagement with the brake piston 6. For example, the member 4 may be received in the through hole or cutout 6*a* extending through the brake piston 6 and is in frictional engagement with an axially extending portion 6*c* of the brake piston 6 enclosing the through hole or cutout 6*a*. Yet more specifically, the conical portion 4*c* of the member 4 is clamped, inserted or wedged into the through hole or cutout 6*a* so that the member 4, or, more specifically, the conical portion 4*c* is compression-loaded perpendicular to the axis 2. The member 4 extends through the through hole or cutout 6*a*. More specifically, both in the braking position of the brake piston 6 depicted in FIGS. 1A and 1*n* the retracted or non-braking position of the brake piston 6 depicted in FIG. 1B the first axial end 4*a* of the member 4 facing the stationary portion 5 along the axis 2 protrudes out of the through hole or cutout 6*a* and the second axial end 4*b* of the member 4 facing away from the stationary portion 5 along the axis 2 protrudes out of the through hole or cutout 6*a*.

In the following, the functioning of the brake piston assembly 100 with respect to the adjustment of the stroke of the brake piston 6 is described.

In the braking position shown in FIG. 1A, a braking force presses the brake piston 6 against the brake plate 7*a* in a direction along the axis 2 facing away from the stationary portion 5, thereby braking the brake disc 8 as described above. Further in the braking position, the second axial end 4*b* of the member 4 facing away from the stationary portion 5 along the axis 2 abuts a portion of the support member 1 in the axial direction, here the axial portion 1*c*, as indicated at 14 in FIG. 1A. At the same time, the first axial end 4*a* of the member 4 facing the stationary portion 5 along the axis 2 is disposed at a distance from the stationary portion 5 along the axis 2, as indicated at 15 in FIG. 1A.

During a braking maneuver, the axial thickness of one or more of the brake plates 7*a*, 7*b* and/or of the brake disc 8 or of the brake piston 6 may slightly decrease due to friction and slip between the brake plates 7*a*, 7*b*, the brake disc 8 and the brake piston 6, for example. In this situation, the brake piston 6 may be slightly advanced further along the axis 2 and away from the stationary portion 5 to compensate for the wear of the brake plates 7*a*, 7*b* and/or of the brake disc 8 and/or of the brake piston 6 and to maintain a constant brake force during braking. For example, a hydraulic pressure in the space 12 between the stationary portion 5 and the brake piston 6 may be increased to overcome the frictional engagement between the member 4 and the brake piston 6, thereby moving the brake piston 6 relative to the member 4 along the axis 2, away from the stationary portion 5 and toward the brake plate 7*a*. This is facilitated by the fact that the conical portion 4*c* of the member 4 which is in frictional engagement with the brake piston 6 tapers along the axis 2 and away from the stationary portion 5. In this way, frictional engagement between the member 4 and the brake piston 6 decreases as the brake piston 6 is axially moved relative to the member 4 away from the stationary portion 5 and toward the brake plate 7*a*.

In order to retract the brake piston 6 from the braking position shown in FIG. 1A to the retracted or non-braking position shown in FIG. 1B, the braking force pressing the brake piston against the brake plate 7*a* may be reduced, for example by reducing a hydraulic pressure in the space 12 formed between the stationary portion 5 and the brake piston 6. The member 3 then moves the brake piston 6 toward the stationary portion 5 along the axial direction 2. Due to the frictional engagement between the brake piston 6 and the member 4 as described above, the member 4 is moved toward the stationary portion 5 along with the brake piston 6. The brake piston 6 and the member 4 are moved toward the stationary portion 5 until the first axial end 4*a* of the member 4 hits the stationary portion 5 in the axial direction 2, here the portion 5*b*, as indicated at 16 in FIG. 2B. At the same time, an axial gap is formed between the second axial end 4*b* of the member 4 and a portion of the support member 1, here the axial portion 1*c* of the support member 1, as indicated at 17 in FIG. 2B.

Once the member 4 hits the stationary portion 5, the frictional engagement between the member 4 and the brake piston 6 prevents the member 3 from pushing the brake piston 6 further toward the stationary portion 5. Or in other words, the spring constant of the member 3 and the frictional force or frictional engagement between the member 4 and the brake piston 6 are chosen such that once the member 4 hits the stationary portion 5 and the stationary portion 5 stops the member 4, the member 3 cannot move the brake piston 6 any further relative to the member 4 and toward the stationary portion 5. For example, this functionality may be aided by the fact that the diameter 4*c*" of the conical portion 4*c* of the member 4, which is frictionally engaged with the portion 6*c* of the brake piston 6 enclosing the through hole 6*b*, increases along the axis 2 and toward the stationary portion 5. In this way, in FIG. 2B further movement of the brake piston 6 relative to the member 4 and toward the stationary portion 5 would further increase frictional engagement between the member 4 and the brake piston 6.

From the foregoing description it follows that the stroke of the brake piston 6 corresponding to the axial distance which the piston 6 travels when moving between the braking position shown in FIG. 1A and the retracted or non-braking position shown in FIG. 1B is given or determined by the axial width of the gap formed between the first axial end 4*a* of the member 4 and the portion 5*b* of the stationary portion 5 indicated at 15 in FIG. 1A, or, equivalently, by the axial width of the gap formed between the second axial end 4*b* of the member 4 and the axial portion 1*c* of the support member 1 indicated at 17 in FIG. 1B. In the embodiment depicted in the figures, the width of the gaps 15, 17 corresponds to the difference between the axial length 1*b*' of the axial portion 1*b* of the support member 1 and the axial length 4' of the member 4, see FIG. 2*b*.

FIGS. 1A, 1B, 2A and 2B are drawn to scale and show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The present application includes operation of the disclosed brake piston assembly to brake an automotive vehicle while the vehicle is traveling. The operation may include operating in the retracted position (or non-braking position) as described herein, as well as the non-retracted position (or braking position) as described herein.

The invention claimed is:

1. A positioning assembly for positioning a brake piston, the positioning assembly comprising:

a support member extending along an axis, a first compression-loaded member, and a second compression-loaded member, wherein the first compression-loaded member and the second compression-loaded member are axially supported on or configured to be axially supported on the support member;

wherein the second compression-loaded member includes a conical portion that tapers along an axial length of the second compression-loaded member;

wherein the second compression-loaded member includes one or more notches that at least partially extend along the conical portion; and wherein the first compression-loaded member at least partially circumferentially surrounds at least a portion of the second compression-loaded member.

2. The positioning assembly of claim 1, wherein the first compression-loaded member is compression-loaded or compressible along the axis and the second compression-loaded member is compression-loaded or compressible perpendicular to the axis.

3. The positioning assembly of claim 1, wherein the first compression-loaded member comprises a compression spring.

4. The positioning assembly of claim 1, wherein the second compression-loaded member is configured to slide on the support member along the axis.

5. The positioning assembly of claim 1, wherein the support member, the first compression-loaded member and the second compression-loaded member are arranged concentrically with respect to the axis.

6. The positioning assembly of claim 1, wherein the support member comprises a first support portion for axially supporting the first compression-loaded member and a second support portion for axially supporting the second compression-loaded member, wherein a maximum diameter of the first support portion perpendicular to the axis differs from a maximum diameter of the second support portion perpendicular to the axis.

7. The positioning assembly of claim 6, wherein the first support portion and the second support portion are axially distanced from one another.

8. The positioning assembly of claim 6, wherein the maximum diameter of the first support portion is greater than the maximum diameter of the second support portion.

9. The positioning assembly of claim 6, wherein when the first compression-loaded member is supported on the first support portion and the second compression-loaded member is supported on the second support portion, the second compression-loaded member extends beyond the first compression-loaded member along the axis.

10. A brake piston assembly, comprising:

a stationary portion, a brake piston, and a positioning assembly, comprising:

a support member extending along an axis, a first compression-loaded member, and a second compression-loaded member, wherein the first compression-loaded member and the second compression-loaded member are axially supported on or configured to be axially supported on the support member;

wherein the support member is rigidly connected to the stationary portion;

wherein the brake piston is movable relative to the stationary portion along a piston axis arranged in parallel to the axis of the support member;

wherein the second compression-loaded member is in frictional engagement with a portion of the brake piston; and wherein the second compression-loaded member and the brake piston are configured such that axial movement of the brake piston relative to the second compression-loaded member toward the stationary portion increases frictional engagement between the second compression-loaded member and the brake piston, and axial movement of the brake piston relative to the second compression-loaded member away from the stationary portion decreases frictional engagement between the second compression-loaded member and the brake piston.

11. The brake piston assembly of claim 10, wherein the first compression-loaded member is axially supported on the brake piston and on the support member and biases the brake piston toward the stationary portion.

12. The brake piston assembly of claim 10, wherein the second compression-loaded member is configured to slide on the support member between a first position in which the second compression-loaded member is axially supported on the stationary portion and a second position in which the second compression-loaded member is axially supported on the support member.

13. The brake piston assembly of claim 10, wherein a diameter of the second compression-loaded member perpendicular to the piston axis increases along the piston axis and toward the stationary portion.

14. The brake piston assembly of claim 10, wherein the brake piston and the positioning assembly are configured such that axial movement of the brake piston away from the stationary portion moves the second compression-loaded member away from the stationary portion until the support member stops further axial movement of the second compression-loaded member away from the stationary portion.

15. The brake piston assembly of claim 10, configured such that the first compression-loaded member is configured to axially move the brake piston and the second compression-loaded member toward the stationary portion until the stationary portion stops further axial movement of the second compression-loaded member and of the brake piston toward the stationary portion.

16. The brake piston assembly of claim 15, wherein the first compression-loaded member, the second compression-loaded member and the brake piston are configured such that when the second compression-loaded member is axially supported on the stationary portion, a force exerted by the first compression-loaded member and biasing the brake piston toward the stationary portion is too small to axially move the brake piston relative to the second compression-loaded member toward the stationary portion against the friction between the second compression-loaded member and the brake piston.

* * * * *